Aug. 30, 1966　　F. HILDEBRANDT ETAL　　3,269,774
MOVABLE SEAT INCLUDING SHOCK-ABSORBING MEANS AND SAFETY BELT
Filed March 30, 1964　　　　　　　　　　　　　2 Sheets-Sheet 1
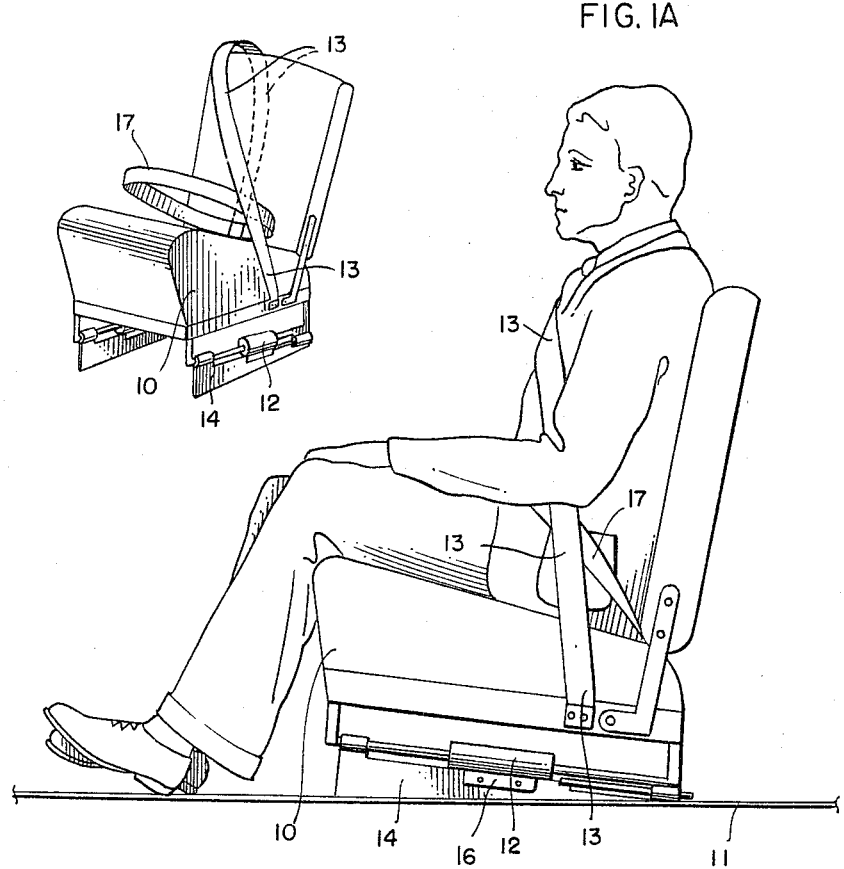
INVENTORS:
FRIEDRICH HILDEBRANDT
FRIEDHELM BELTHLE
BY *Margaret Johnston Cook & Root*
ATT'YS

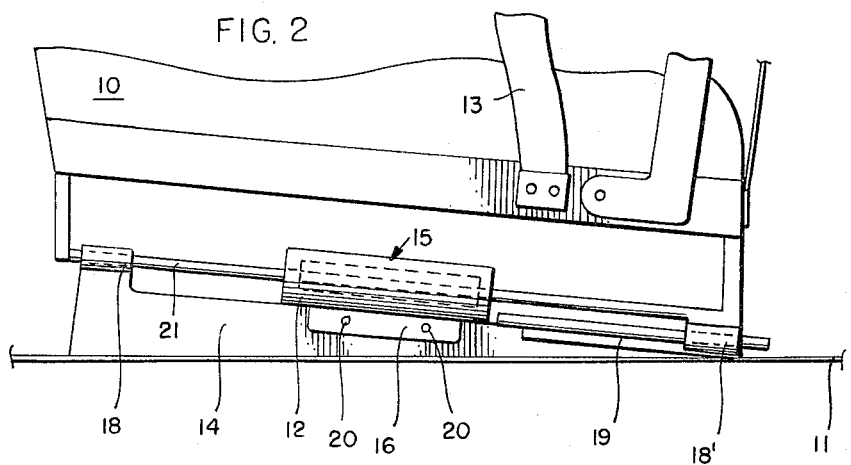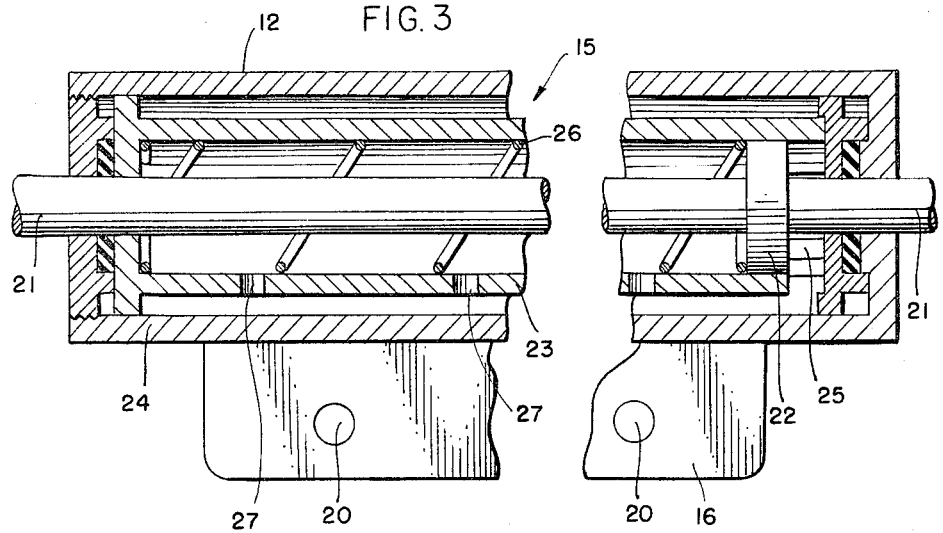

United States Patent Office 3,269,774
Patented August 30, 1966

3,269,774
MOVABLE SEAT INCLUDING SHOCK-ABSORBING
MEANS AND SAFETY BELT
Friedrich Hildebrandt, Wuppertal-Elberfeld, and Friedhelm Belthle, Dremmen, Germany, assignors to Vereinigte Glanzstoff-Fabriken AG., Wuppertal-Elberfeld, Germany
Filed Mar. 30, 1964, Ser. No. 355,767
Claims priority, application Germany, Apr. 4, 1963,
V 23,894
2 Claims. (Cl. 297—386)

The present invention is directed to a safety device that can be used by occupants of airplanes and motor vehicles.

Safety belts are used in automobiles and airplanes primarily to prevent the rapid forward movement of occupants which occurs in an airplane crash landing or in an automobile collision. The belts also damp the shock of the forward movement in such a way that the occupants are not thrown backward into the seat and, therefore, are not physical harmed. In the process the kinetic energy that is liberated is nullified in part by a permanent deformation of the textile belt material.

A novel safety device is disclosed in copending application Serial No. 323,431 which was filed on November 13, 1963. The device includes a holding belt which is substantially unstretchable and which is connected or coupled directly to a braking means capable of absorbing severe braking shocks. The kinetic energy that is liberalized in a sudden and severe change of velocity such as occurs during a collision and acts on the occupants of the vehicle is nullified not by the safety belt itself but by a braking device connected to the safety belt. The subject invention constitutes a modification of the safety device disclosed in said application Serial No. 323,431. The disclosure of said copending application No. 323,431 is specifically incorporated in the subject disclosure by reference.

As is pointed out in said copending application, one of the major problems encountered in producing conventional safety belts lies in the formation of definite stretch relationships such as the ratio of total stretch to the remaining stretch. The ratio is largely determined by the nature and the properties of the textile materials and also by the belt design. For this reason, the stretch relationship is subject to certain fluctuations. A further drawback of the known safety belts lies in the fact that their stretch behavior cannot be adapted to the body weight of the wearer and has to be set for the average weight of an adult. Such a belt cannot be effective in the case of a child. There is an additional point that the stretch behavior of the known safety belts is adjusted for maximum strain, that is, for a catastrophic occurrence. The preferably irreversible stretch cannot be utilized, therefore, for the balancing of small and medium brake shocks to which the occupants of motor vehicles are occasionally exposed. Furthermore, if the belt is once fully strained in a severe braking shock, it cannot be further used as a safety device.

It is an object of the present invention to provide a safety device which overcomes the problems set out above.

Other objects will become apparent to those skilled in the art from the following detailed description of the invention.

It has been found that the kinetic energy liberated when a motor vehicle strikes an obstacle or in the crash landing of an airplane, insofar as it acts on the occupants of the vehicle, can be transformed in an effective manner and in a harmless manner for the passengers by means of a particular safety device. This safety device is constructed as a safety seat. The safety device includes a seat that is movable forward in case of severe braking and braking means that engages the movable seat. The device also includes a pelvis-shoulder oblique belt of a material that is substantially undeformable and which is loosely engaged about the person to be protected. The belt is attached at one end to the seat. In order for this type of safety device to be fully effective, the person to be protected must be held securely on the seat in such a manner that in the case of sudden braking he can neither slip off the seat nor, with the upper part of the body thrown forward, strike against the dashboard, instrument panel, wheel, etc. On the other hand, the operator of the airplane or motor vehicle must not be cramped or hampered in his movements by the holding belt. This would prove especially troublesome on long trips. Both of these objectives are achieved in a simple manner through the use of the belt described in connection with the drawing. The unstrained holding belt is normally placed loosely about the person to be protected so that he can move unhampered on the seat and change his body position. The belt is attached at one end to the side of the seat, leads upward as a shoulder cross belt in front of the upper part of the trunk, passes over the opposite shoulder, behind the backrest, and from there between the backrest and the seat and is looped around the pelvis of the person to be protected.

The invention can best be understood by reference to the attached drawing in which:

FIG. 1 is a perspective view of the subject seat and belt arrangement;

FIG. 1A is a side elevational view showing the braking device and its use in conjunction with a vehicle passenger;

FIG. 2 is a side view showing in greater detail the braking device and its attachment to the seat of the vehicle; and FIG. 3 is a diametric cross-sectional view of a braking device that can be used in the subject invention.

In FIG. 1 a safety device of the present invention is shown mounted, for example, in an automobile. As is apparent from this figure, both the person to be protected and seat 10 will have a tendency by reason of mass inertia to continue in a forward direction when the vehicle is braked. Initially, the movement of the occupant may not be braked at all while the slightest forward movement of seat 10 with respect to vehicle floor 11 causes braking means 12 to go into action. Due to the relative movement occurring between the person and seat 10, holding belt 13 tightens and binds the person securely on seat 10. For this reason the shock absorption of braking means 12 is transmitted over seat 10 and holding belt 13 to the person to be protected. In the device shown in FIG. 1A, the lower portion of seat 10 is movably mounted on base plate 14 which, in turn, is anchored to vehicle floor 11. Braking means 12 is attached to base plate 14 by means of attaching bridge 16. The person to be protected is loosely held on seat 10 by means of holding belt 13 and crossbelt 17. In place of the holding belt it is possible, of course, for one to use suitably designed hinged arms in order to hold the person securely on the seat. The braking device is designed in such a manner that it responds only in the case of severe braking shocks as in a catastrophic situation so that the seat does not move forward and backward at each reduction in speed whereby the operation of the vehicle would be disturbed. Depending upon the magnitude of the braking, the braking device takes over only when there is a substantial need for it to operate.

In FIG. 2, the braking device is shown on a larger scale. Base plate 14 is attached to vehicle floor 11. A portion of base plate 14 is formed at the front into guide 18 and at the rear by guide rod 19. At the rear of the base plate 14 there is also a guide 18'. As is apparent from this figure, guide 18' is movably mounted on guide rod 19. Brake cylinder 15 is securely anchored by means of attaching bridge 16 to base plate 14. Bolts 20 are used to secure the attaching bridge to the base plate. Piston rod 21 emerges from both ends of brake cylinder 15 and can constitute a base flange of seat 10.

FIG. 3 is a sectional view showing a hydraulically acting braking system. The construction of this device is comparable to the brake shown in FIG. 2 of patent application Serial No. 323,431. The distinction between this brake cylinder and the brake cylinder in application Serial No. 323,431 resides in the fact that piston rod 21 can pass out both ends of the cylinder. As was pointed out above, the safety device of the subject invention responds only to severe and sudden speed changes. If, for example, an obstacle is struck and the vehicle is suddenly stopped, the person in the safety device as a result of his mass inertia tends to continue in a forward direction. Inasmuch as the seat and the person are then securely bound by the belt, this force acting in the direction that the vehicle was traveling in transmitted to the seat and thereby to the braking device. Piston rod 21 which preferably is the lower flange of seat 10, slides in forward guide 18. Rear guide 18', like piston rod 21, is preferably a solid component of seat 10 and slides on guide bar or rod 19. Piston 22 also moves as piston rod 21 is moved. The movement of the piston is damped to an ever stronger degree by the brake fluid in shock absorber or brake cylinder 15. This process proceeds as follows:

When piston 22 moves in the cylinder, it presses the fluid present in inner cylinder 23 through escape openings 27 into the space between inner cylinder 23 and outer cylinder 24. Additionally, the brake fluid flows through inlet slit 25 behind piston 22. In the course of the movement of the piston, little by little the outlet openings for the passage of the fluid under pressure in inner cylinder 23 drop out. Thereby, with increasing piston movement the damping effect of the device rises. Spring 26 only has as its function that of restoring piston 22 and thereby seat 10 to their rest positions.

In addition to the hydraulic system shown in FIG. 3, the kinetic energy can be compensated by the other means disclosed in copending patent application Serial No. 323,431. These other means include a mechanical braking device such as is shown in FIG. 3 of said copending application as well as a pneumatic brake cylinder and/or an electrically operated brake cylinder.

The subject device has the further advantage that the device or brake cylinder and the attaching bridge can be moved on the base plate 14 with the aid of a number of holes in the base plate for the bolts 20. This makes it possible to adapt the distance between the seat and operating elements of the vehicle to the body size of the driver.

A number of different arrangements for the braking device is within the contemplation of the subject invention. The safety device shown in the drawings can be installed in individual seats. For this purpose it is advantageous to arrange a brake cylinder on the lower flange of the seat and to have the flange act as a piston rod. This system provides shock absorption on both sides of the seat without it being possible for a tilting to occur in the guides. Moreover, the cylinder has to compensate for only one-half of the kinetic energy. Thereby, the structural dimensions of the braking cylinder, etc., can be considerably reduced. It is also possible to brake all of the seats of a vehicle at the same time and with the same device. For this purpose the seats have to be mounted on a slide, which, guided on slide rails, is moved forward a certain distance in the vehicle and is intercepted in its path by braking elements such as those described in the drawings.

Obviously many modifications and variations of the invention as hereinbefore set forth may be made without departing from the spirit and scope thereof, and therefore only such limitations should be imposed as are indicated in the appended claims.

We claim:
1. A safety device for occupants of vehicles which comprises in combination: a base plate fixedly mounted on the floor of said vehicle; braking means including a cylinder mounted on said base plate; a seat structure movably mounted on said base plate, said seat structure including two base flanges in the form of piston rods; guide means on said base plate; said base flanges of said seat structure being mounted within said guide means for passage through said cylinder; a piston mounted on said base flanges for movement within said cylinder; said braking means including means for ever increasing the damping effect produced by the movement of said piston as said piston moves in a forward direction within said cylinder; spring means within said cylinder for returning said piston and said seat structure to their rest positions, and holding means attached to said seat structure for maintaining a passenger in said seat.

2. A safety device for occupants of vehicles which comprises in combination: a base plate fixedly mounted on the floor of said vehicle; braking means including a cylinder mounted on said base plate; a seat structure movably mounted on said base plate, said seat structure including two base flanges in the form of piston rods; guide means on said base plate; said base flanges of said seat structure being mounted within said guide means for passage through said cylinder; a piston mounted on said base flanges for movement within said cylinder; said braking means including means for ever increasing the damping effect produced by the movement of said piston as said piston moves in a forward direction within said cylinder; spring means within said cylinder for returning said piston and said seat structure to their rest positions, and holding means attached to said seat structure for maintaining a passenger in said seat, said holding means including a belt which is attached with one end to a side of said seat, is conducted in front of the upper part of the trunk of said passenger upwards as a shoulder crossbelt, over the shoulder of said passenger opposite the side of said seat to which said belt is attached, behind the backrest of said seat and from there between the backrest and seat and is conducted as a loop about the pelvis of the passenger.

References Cited by the Examiner

UNITED STATES PATENTS

| | | | |
|---|---|---|---|
| 523,242 | 7/1894 | Smith | 188—97 X |
| 1,590,414 | 6/1926 | Bosserdet | 188—97 |
| 1,821,787 | 9/1931 | Black | 267—1 |
| 1,951,483 | 3/1934 | Knapp et al. | 188—97 |
| 2,346,895 | 4/1944 | Bergman | 297—216 |
| 2,401,748 | 6/1946 | Dillon | 297—216 X |
| 2,680,476 | 6/1954 | Saffell | 280—150 X |
| 2,710,649 | 6/1955 | Griswold et al. | 297—389 |
| 2,791,793 | 5/1957 | Fenton | 188—97 X |
| 2,851,904 | 9/1958 | Banek | 267—70 X |
| 2,993,732 | 7/1961 | Walker | 297—216 |
| 3,043,625 | 7/1962 | Bohlin | 297—389 |
| 3,125,376 | 3/1964 | Duijvendijk et al. | 297—150 X |
| 3,174,798 | 3/1965 | Sprague | 280—150 X |

FOREIGN PATENTS

| | | |
|---|---|---|
| 1,008,155 | 2/1952 | France. |
| 1,307,758 | 9/1962 | France. |
| 144,067 | 2/1954 | Sweden. |

MILTON BUCHLER, *Primary Examiner.*

G. E. A. HALVOSA, *Assistant Examiner.*